United States Patent [19]

Ziemke et al.

[11] 4,034,125
[45] July 5, 1977

[54] SOURDOUGH COMPOSITIONS

[75] Inventors: William H. Ziemke, San Jose, Calif.; Elmer F. Glabe, Northbrook, Ill.

[73] Assignee: Food Technology Products, Chicago, Ill.

[22] Filed: Dec. 31, 1975

[21] Appl. No.: 645,537

[52] U.S. Cl. .................. 426/650; 426/25; 426/653
[51] Int. Cl.² .............. A21D 2/08; A21D 2/18
[58] Field of Search ............ 426/25, 650, 653

[56] References Cited

UNITED STATES PATENTS

| 3,897,568 | 7/1975 | Johnson | 426/75 |
| 3,922,350 | 11/1975 | Dockendorf et al. | 426/25 |

*Primary Examiner*—Raymond N. Jones
*Attorney, Agent, or Firm*—Richard L. Johnston

[57] ABSTRACT

A sourdough composition is provided in the form of a flowable powder for the introduction of acetic acid and lactic acid into bread doughs and other bakery products. The composition is preferably stabilized against premature loss of acetic acid by intimate dispersion with a minor quantity of a normally solid edible fatty material.

8 Claims, No Drawings

SOURDOUGH COMPOSITIONS

BACKGROUND

The standard procedure for making sourdough bread involves a long process. The basis for the process is fermentation of a wheat flour-based dough by bacterial organisms which have the ability to produce lactic and acetic acids. This fermentation process is maintained by daily additions of flour and other nutrient materials such as nonfat dry milk and occasionally potato flour. Portions of this "ferment" are then used by adding them to standard French bread or sourdough bread formulae. An example of a French sourdough bread formula is as follows:

| French Bread Straight Dough Process | Pounds |
| --- | --- |
| White Flour | 100 |
| Water | 55–58 |
| Salt | 2 |
| Sourdough ferment | 20 |

One of the difficulties attendant to the operation of this sourdough bread process is the need to maintain perfect fermentation conditions for the bacterial organisms and to make regular additions to the ferment every 24 hours.

The bacterial organisms commonly go through changes which frequently results in lowered production of acetic and lactic acids. The baker, therefore, is faced with considerable difficulty in maintaining a constant flavor level in sourdough breads produced in this fashion on a day-to-day basis.

The flavor of sourdough bread is based on its high acidity due to acetic and lactic acids. The total acidity of sourdough bread is roughly 10 times that of conventional bread. Of this acidity, the acetic acid is the more important of the two acids in providing the characteristic sourdough flavor. Acetic acid is also the most volatile of the two acids. This volatility is probably responsible for the variation in the flavor of sourdough breads produced by the conventional process. The volatility of the acetic acid causes its escape from the sourdough bread ferment; this characteristic is also responsible for its evaporation during the oven baking step in making sourdough bread.

A convenient and safe and efficient sourdough bread compound which the baker would desire is a dry compound, one which can be handled with ease like flour. It is also one which can be packed in standardized packing materials and shipped long distances without loss of acetic and lactic acid. Such compounds of this type have not been available for commercial use.

OBJECTS

One of the objects of the present invention is to provide a new and improved sourdough composition in the form of a flowable powder for the introduction of acetic acid and lactic acid into bread doughs including white breads, rye breads, and other speciality breads, particularly that class of white breads known as "sourdough bread" of which there are two major classes, (a) French bread, and (b) San Francisco sourdough bread.

Another object of the invention is to provide compositions for improving the flavor of standard white bread.

Still another object of the invention is to provide compositions to improve the flavor of yeast-raised products including breads, rolls and buns.

An additional object of the invention is to provide a composition for improving the flavor of chemically leavened products including biscuits, pancakes and waffles. Other objects will appear hereinafter.

BRIEF SUMMARY OF THE INVENTION

A sourdough composition in the form of a flowable powder for the introduction of acetic acid and lactic acid into bread doughs and other bakery products is prepared comprising minor quantities of acetic acid and lactic acid absorbed on a major quantity of a finely divided solid edible absorptive starchy polysaccharide or cellulose.

In accordance with the preferred embodiment of the invention the aforesaid compositions are stabilized against premature loss of acetic acid by intimate dispersion of the components of the composition with a minor quantity of a normally solid edible fatty material.

DETAILED DESCRIPTION OF THE INVENTION

For the purpose of the invention the quantity of acetic acid is preferably within the range of 2% to 15% by weight of the composition. The quantity of lactic acid is preferably within the range of 1% to 8% by weight of the composition. The weight ratio of acetic acid to lactic acid is preferably at least 1:1 and is preferably within the range of 1:1 to 7:1.

If a stabilizing fatty material is used in accordance with the preferred embodiment of the invention it is preferably a fatty material having a melting point of at least 90° F. and the amounts employed are preferably within the range of 2.5% to 10% by weight of the composition.

In the practice of the invention the acetic acid is usually employed in the form of glacial acetic acid. The lactic acid is usually employed in the form of an aqueous solution having an 80% by weight concentration of lactic acid. However, a part of the lactic acid can be supplied by using a commercial dairy product containing lactic acid such as acid whey and in that event the quantity of lactic acid, which is added per se in the preparation of the composition, can be as low as 0.2% by weight. A portion of the lactic acid can also be replaced with another edible carboxylic acid such as, for example, fumaric acid and/or citric acid. These acids contain 3 to 6 carbon atoms and 1 to 3 carboxy groups and may or may not be substituted with a hydroxyl group.

The starchy polysaccharides can consist of extracted starches such as wheat and corn as well as tapioca starch and potato starch and the corresponding flours, such as wheat flour and corn flour as well as starches and flours derived from waxy maize, rice flour, and other cereal starches and flours. The starchy polysaccharide can be gelatinized or ungelatinized. A preferred type of starchy polysaccharide for the purpose of the invention is pregelatinized wheat starch. If finely divided cellulose is used as the absorbent, good results are obtained by the use of an edible wood flour. One such type of flour which is available commercially is Solka-Floc SW40. Other cellulosic absorbents which can be employed are methyl cellulose and carboxy methyl cellulose.

In general, the starchy polysaccharides and the cellulosic absorbents will have a particle size within the range of 20 to 350 mesh (Standard Sieve series). The Solka-Floc has a particle size of approximately 30 mesh.

In some cases, for example where hydroxylated lecithin is used as an emulsifier and a wood flour such as Solka-Floc is employed as the absorbent, it is desirable to add a small amount of an anti-oxidant, for instance 0.1% to 2% by weight of butylated hydroxy toluene (HBT) or butylated hydroxy anisole (BHA). These are recognized food antioxidants.

Lecithin, hydroxylated lecithin and the mono- and diglycerides have the dual function of acting as stabilizers and also as emulsifiers.

Examples of fatty materials which may be used in preparing the compositions of the invention are lecithin, hydroxlated lecithin, mono- and diglycerides and highly hydrogenated vegetable oil shortenings, and similar fatty compositions. These fatty materials serve to hold the acetic acid and lactic acid in the absorbent, thereby acting as stabilizing agents, and also reducing, if not completely preventing, the evaporation of these acids during the oven baking stage of the sourdough bread process. For the purpose of the invention the fatty materials employed as stabilizing agents in these compositions are normally solid at ambient temperatures of 25° C. and have a melting point of at least 90° F. (about 32° C.).

The invention will be further illustrated but is not limited by the following examples in which the quantities are given by weight unless otherwise indicated.

EXAMPLE I

A flowable sourdough composition is prepared from the following ingredients:

| Ingredients | Percent by Weight |
|---|---|
| Glacial acetic acid | 12.5 |
| Lactic acid (80% strength) | 2.5 |
| Mono- and diglyceride fat compound (Atmul 500) | 2.5 |
| High melting point vegetable oil fat (Kao-Rich) | 5.0 |
| Gelatinized wheat starch | 77.5 |
| | 100.0% |

The Atmul 500 and Kao-Rich are warmed to a point where they are completely liquid. The lactic acid is then added, followed by the acetic acid, forming a dispersion. The dispersion is then blended with the starch in a standard ribbon blender by pouring it into the gelatinized starch while the mixer is in operation, or by spraying it into the starch with the mixer in operation.

The resulting mixture is then placed in polyethylene-lined bags or cartons for use in making sourdough bread.

EXAMPLE II

The procedure is the same as in Example I except that the following ingredients are used:

| Ingredients | Percent by Weight |
|---|---|
| Glacial acetic acid | 12.5 |
| Lactic acid (80% strength) | 2.5 |
| Mono- and diglyceride fat compound (Atmul 500) | 2.5 |
| High melting point vegetable oil fat (Kao-Rich) | 5.0 |
| Wheat flour | 77.5 |
| | 100.0% |

EXAMPLE III

The procedure is the same as in Example I except that the following ingredients are used:

| Ingredients | Percent by Weight |
|---|---|
| Glacial acetic acid | 12.5 |
| Lactic acid (80% strength) | 2.5 |
| Mono- and diglyceride fat compound (Atmul 500) | 2.5 |
| High melting point vegetable oil fat (Kao-Rich) | 5.0 |
| Gelatinized wheat starch | 38.75 |
| Wheat flour | 38.75 |
| | 100.00% |

EXAMPLE IV

The procedure is the same as in Example I except that pre-gelatinized corn starch is used instead of the wheat starch. A wide variety of pre-gelatinized corn starches is available commercially and of these both the starches from dent corn and waxy maize are used.

EXAMPLE V

The procedure is the same as in Example I except that the following ingredients are used:

| Ingredients | Percent by Weight |
|---|---|
| Glacial acetic acid | 2.5 |
| Lactic acid (80% strength) | 2.5 |
| Mono- and diglyceride fat compound (Atmul 500) | 2.5 |
| High melting point vegetable oil fat (Kao-Rich) | 5.0 |
| Gelatinized wheat starch | 87.5 |
| | 100.0% |

EXAMPLE VI

The procedure is the same as in Example I except that the following ingredients are used:

| Ingredients | Percent by Weight |
|---|---|
| Glacial acetic acid | 15.0 |
| Lactic acid (80% strength) | 2.5 |
| Mono- and diglyceride fat compound (Atmul 500) | 2.5 |
| High melting point vegetable oil fat (Kao-Rich) | 5.0 |
| Gelatinized wheat starch | 75.0 |
| | 100.0% |

EXAMPLE VII

The procedure is the same as in Example I except that the following ingredients are used:

| Ingredients | Percent by Weight |
|---|---|
| Glacial acetic acid | 12.5 |
| Lactic acid (80% strength) | 1.0 |
| Mono- and diglyceride fat compound | 2.5 |
| High melting point vegetable oil fat (Kao-Rich) | 5.0 |
| Gelatinized wheat starch | 79.0 |
| | 100.0% |

EXAMPLE VIII

The procedure is the same as in Example I except that the following ingredients are used:

| Ingredients | Percent by Weight |
| --- | --- |
| Glacial acetic acid | 12.5 |
| Lactic acid (80% strength) | 5.0 |
| Mono- and diglyceride fat compound (Atmul 500) | 2.5 |
| High melting point vegetable oil fat (Kao-Rich) | 5.0 |
| Gelatinized wheat starch | 75.0 |
| | 100.0% |

EXAMPLE IX

The procedure is the same as in Example I except that the following ingredients are used:

| Ingredients | Percent by Weight |
| --- | --- |
| Glacial acetic acid | 12.5 |
| Lactic acid (80% strength) | 2.5 |
| Mono- and diglyceride fat compound (Atmul 500) | 1.0 |
| High melting point vegetable oil fat (Kao-Rich) | 6.5 |
| Gelatinized wheat starch | 77.5 |
| | 100.0% |

EXAMPLE X

The procedure is the same as in Example I except that the following ingredients are used:

| Ingredients | Percent by Weight |
| --- | --- |
| Glacial acetic acid | 12.5 |
| Lactic acid (80% strength) | 2.5 |
| Mono- and diglyceride fat compound (Atmul 500) | 5.0 |
| High melting point vegetable oil fat (Kao-Rich) | 2.5 |
| Gelatinized wheat starch | 77.5 |
| | 100.0% |

EXAMPLE XI

The procedure is the same as in Example I except that the following ingredients are used:

| Ingredients | Percent by Weight |
| --- | --- |
| Glacial acetic acid | 12.5 |
| Lactic acid (80% strength) | 2.5 |
| Mono- and diglyceride fat compound (Atmul 500) | 2.5 |
| High melting point vegetable oil fat (Kao-Rich) | 1.0 |
| Gelatinized wheat starch | 81.5 |
| | 100.0% |

EXAMPLE XII

The procedure is the same as in Example I except that the following ingredients are used:

| Ingredients | Percent by Weight |
| --- | --- |
| Glacial acetic acid | 12.5 |
| Lactic acid (80% strength) | 2.5 |
| Lecithin | 2.5 |
| High melting point vegetable oil fat (Kao-Rich) | 5.0 |
| Gelatinized wheat starch | 77.5 |
| | 100.0% |

EXAMPLE XIII

The procedure is the same as in Example I except that the following ingredients are used:

| Ingredients | Percent by Weight |
| --- | --- |
| Glacial acetic acid | 12.5 |
| Lactic acid (80% strength) | 2.5 |
| Hydroxylated lecithin | 2.5 |
| High melting point vegetable oil fat (Kao-Rich) | 5.0 |
| Gelatinized wheat starch | 77.5 |
| | 100.0% |

EXAMPLE XIV

The following example illustrates the preparation of a flowable sourdough powder composition without the addition of the fatty material as a stabilizing agent. The ingredients employed are as follows:

| Ingredients | Percent by Weight |
| --- | --- |
| Glacial acetic acid | 12.5 |
| Lactic acid (80% strength) | 2.5 |
| Gelatinized wheat starch | 85.0 |
| | 100.0% |

The acetic and lactic acids are mixed and this mixture is then added to the gelatinized wheat starch in a rapidly-turning ribbon blender of stainless steel construction. The addition of the acids is made by pouring or by spraying.

In this formula, wheat flour and corn flour and pregelatinized corn starches are applicable as indicated in the previous examples. The gelatinized starches are superior to the wheat flour and corn flour, since they absorb the acids much more readily.

It should be understood that in all of these examples, gelatinized wheat flour and gelatinized corn flour may also be used in place of either/or gelatinized wheat starch and gelatinized corn starch. Furthermore, tapioca starch, gelatinized or ungelatinized, potato starch, gelatinized or ungelatinized, and potato flour can be used.

The stabilizing materials serve to encapsulate the acetic and lactic acids and to prevent lumping and packing of the product during storage and transportation.

The following emulsifier compounds have been found to be useful: ethoxylated mono- and diglycerides, propylene glycol mono- and diesters of fat forming fatty acids, calcium stearyl-2-lactylate, and diacetyl tartaric acid esters of mono- and diglycerides of fat forming fatty acids.

EXAMPLE XV

This example illustrates the use of edible cellulose compounds as absorbents which can partially or completely supplant the starch or flour compounds employed in the preceding examples. The process is carried out in the same way as in Example I using the following ingredients:

| Ingredients | Percent by Weight |
| --- | --- |
| Glacial acetic acid | 12.5 |
| Lactic acid (80% strength) | 2.5 |

-continued

| Ingredients | Percent by Weight |
|---|---|
| Hydroxylated lecithin | 2.5 |
| High melting point vegetable oil fat (Kao-Rich) | 5.0 |
| Edible wood flour (Solka-Floc SW40) | 77.5 |
| | 100.0% |

EXAMPLE XVI

The procedure is the same as in Example I except that the following ingredients are used:

| Ingredients | Percent by Weight |
|---|---|
| Glacial acetic acid | 12.5 |
| Lactic acid (80% strength) | 2.5 |
| Hydroxylated lecithin | 2.5 |
| High melting point vegetable oil fat (Kao-Rich) | 5.0 |
| Tenox fat antioxidant (BHA) | 1.0 |
| Edible wood flour (Solka-Floc SW40) | 76.5 |
| | 100.0% |

EXAMPLE XVII

The process is the same as in Example I except that the acids are combined and then mixed directly with the starch and dry whey which are previously blended together. In this case the dry whey supplies a portion of the lactic acid. The following ingredients are used:

| Ingredients | Percent by Weight |
|---|---|
| Glacial acetic acid | 2.5 |
| Lactic acid (80% strength) | 0.25 |
| Gelatinized wheat starch | 82.25 |
| Acid whey (commercial dairy product) | 15.00 |
| | 100.00% |

EXAMPLE XVIII

This example illustrates the preparation of a sourdough composition powder in which the lactic acid is partially replaced with citric and fumaric acids. The following ingredients are used:

| Ingredients | Percent by Weight |
|---|---|
| Glacial acetic acid | 12.5 |
| Lactic acid (80% strength) | 1.0 |
| Fumaric acid | 0.75 |
| Citric acid | 0.75 |
| Mono- and diglyceride fat compound (Atmul 500) | 2.5 |
| High melting point vegetable oil fat (Kao-Rich) | 5.0 |
| Gelatinized wheat starch | 77.5 |
| | 100.00% |

BREAD BAKING EXAMPLES

The following examples illustrate the use of the compositions of the invention in making different types of bread.

| French Bread Straight Dough Process Ingredients | Pounds |
|---|---|
| White flour | 100 |
| Water | 50–58 |
| Salt | 1 |
| Yeast | 2–3 |

| French Bread Straight Dough Process Ingredients | Pounds |
|---|---|
| Sourdough composition powder of Example I | 3 |

The dough temperature out of the mixer should be 80° F. The dough should be mixed to the "breaking point". Do not use yeast nutrients. Floor time for the dough should be no more than 20 minutes. Make up immediately. Proof should be 80–90 minutes for best results.

| San Francisco Sourdough Bread Sponge and Dough Process | | |
|---|---|---|
| Ingredients | Sponge (lbs) | Dough (lbs) |
| White flour | 60 | 40 |
| Water | variable | variable |
| Yeast | 1.5–2.5 | |
| Salt | | 1.75 |
| Sugar | | 2 |
| Shortening | | 1* |
| Sourdough composition powder of Example I | | 3 |
| Temperature | 76° F. | 79° F. |
| Time | 3¾–4 hrs. | Mix the dough to the breaking point. The floor time should be no longer than 20 minutes. Open the molder sheeter rolls to give less pressure in order to develop an open-textured bread. Proof the doughs for 80–90 minutes for best results. Bake as usual. |

*1 lb. if bread is sliced--otherwise, no shortening is required.

Instead of the sourdough composition powder of Example I any of the sourdough composition powders described in the examples can be employed in a similar manner in the making of various types of bread.

For improving flavor in white bread, 1% of the sourdough bread base as shown in Example I is employed. The sourdough bread compound is added with the other ingredients in the mixer at the dough stage. One pound of water for each pound of sourdough powder composition is also added. All other processing operations are unchanged. The flavor of the finished bread is specifically improved.

Rye bread and other specialty breads are handled in a similar manner, that is, 1% to 3% of the sourdough powder composition is added to the standard bread formula. The acids provided by the sourdough powder compositon significantly improves the general flavor of the bread.

The efficiency and ease of handling provided by these sourdough powder compositions described in the above examples is demonstrated in several ways. In making the breads described above, the addition of glacial acetic acid and commercial lactic acid to the bread and dough rolls in a standard commercial bakery is not practical. In fact, it may be dangerous to inexperienced personnel. The acids are difficult to handle because of their corrosiveness. Furthermore, unless the acids are dispersed and suspended on the materials described above, they will have a drastic retarding effect on the carbon dioxide-producing capacity of bakers yeast. The result is that breads made from such doughs will be very seriously lacking in loaf volume, in crust development, and will be commercially unsalable.

The preblending of the acids with the other ingredients in the sourdough powder compositions permits the yeast to ferment the sugars in the formula and the flour in a more normal fashion. Even under the best of circumstances, the dough fermentation is somewhat slowed when the conpositions of this invention are used. However, the retardation of fermentation is well within practical limits in commercial bread baking. As a demonstration of this, the following results were obtained in comparative tests.

| Formula | Bread Dough Mixing Time | Bread Proofing Time | pH of the Finished Bread |
|---|---|---|---|
| Standard Formula No Acids added | 10.5 min. | 60 min. | 5.2 |
| Sourdough Bread Powder composition of Example I added | 14.5 | 72 | 4.4 |
| Liquid acetic and lactic acids added directly to bread dough | 14.5 | 120 | 4.35 |

The free acetic acid excessively retarded the proof time. Such use of acetic acid would not be practical from a commercial standpoint. On the other hand, the sourdough powder composition provided the ability to add the highly-flavorful acetic and lactic acids within commercially acceptable limits of bread baking operations.

It should be understood that in the above examples glacial acetic acid can be supplanted by commercial or technical grades of acetic acid provided they are food grades.

The invention is hereby claimed as follows:

1. A baking ingredient for use in making sourdough bakery products, said baking ingredient being in the form of a flowable powder for the introduction of acetic acid and lactic acid into bread doughs and other bakery products comprising minor quantities of acetic acid and lactic acid absorbed on a major quantity of a finely divided solid edible absorbent which is a starch polysaccharide or an edible cellulosic material, such baking ingredient being stabilized against premature loss of acetic acid and lactic acid, by intimate dispersion with a minor quantity of a normally solid edible fatty glyceride material sufficient to hold said acids in the absorbent and reduce evaporation of said acids during oven baking of said sourdough bakery products, the quantity of acetic acid being within the range of 2% to 15% by weight and the quantity of lactic acid being within the range of 1% to 8% by weight, and the weight ratio of acetic acid to lactic acid being at least 1:1.

2. A baking ingredient as claimed in claim 1 in which the quantity of normally solid edible fatty material is within the range of 2.5% to 10% by weight of the composition.

3. A baking ingredient as claimed in claim 1 in which the starchy polysaccharide is a gelatinized wheat starch.

4. A baking ingredient as claimed in claim 1 in which the lactic acid is partially replaced with a compound from the group consisting of acid whey, fumaric acid and citric acid provided that the amount of lactic acid is at least 0.2% by weight of said baking ingredient.

5. A baking ingredient for use in making sourdough baking products, said baking ingredient being in the form of a flowable powder comprising 2% to 15% by weight glacial acetic acid, 1% to 8% by weight lactic acid, the weight ratio of acetic acid to lactic acid being within the range of 1:1 to 7:1, a normally solid vegetable oil fat having a melting point of at least 32° C., an emulsifier selected from the group consisting of lecithin, hydroxylated lecithin and mono- and diglycerides, the quantity of said vegetable oil fat and said emulsifier both being within the range of 2.5% to 10% by weight and the remainder of the composition consisting essentially of a finely divided solid edible absorbent which is a starchy polysaccharide or an edible cellulosic material having a particle size within the range of 20 to 350 mesh into which the acetic acid and lactic acid are absorbed.

6. A baking ingredient as claimed in claim 5 in which said absorbent is a starchy polysaccharide.

7. A baking ingredient as claimed in claim 6 in which said starchy polysaccharide is a pregelatinized wheat starch.

8. A baking ingredient as claimed in claim 5 in which said absorbent is a cellulosic material selected from the group consisting of edible wood flour, carboxy methyl cellulose and methyl cellulose.

* * * * *

UNITED STATES PATENT AND TRADEMARK OFFICE
CERTIFICATE OF CORRECTION

PATENT NO. : 4,034,125
DATED : July 5, 1977
INVENTOR(S) : WILLIAM H. ZIEMKE and ELMER F. GLABE It is certified that error appears in the above-identified patent and that said Letters Patent are hereby corrected as shown below:

"Assignee." - "Food Technology Products, Chicago, Ill." should read --Food Technology Products, Chicago, Ill., part interest.

Signed and Sealed this

Eighth Day of November 1977

[SEAL]

Attest:

RUTH C. MASON
Attesting Officer

LUTRELLE F. PARKER
Acting Commissioner of Patents and Trademarks